United States Patent [19]

Bieber

[11] Patent Number: 4,819,774

[45] Date of Patent: Apr. 11, 1989

[54] DRIVE ARRANGEMENT FOR COMMERCIAL MOTOR VEHICLES

[75] Inventor: Gerold Bieber, Langenargen, Fed. Rep. of Germany

[73] Assignee: Zahnradfabrik Friedrichshafen AG, Friedrichshafen, Fed. Rep. of Germany

[21] Appl. No.: 140,466

[22] Filed: Jan. 4, 1988

Related U.S. Application Data

[63] Continuation-in-part of Ser. No. 887,171, filed as PCT EP85/00554 on Oct. 21, 1985, published as WO86/02608 on May 9, 1986, abandoned.

[30] Foreign Application Priority Data

Oct. 24, 1984 [WO] -PCT Int'l Appl. .................. PCT/EP84/00326
Oct. 21, 1985 [WO]    PCT Int'l Appl.   PCT/EP85/00554

[51] Int. Cl.$^4$ ...................... B60K 41/26; F16D 57/06
[52] U.S. Cl. .................................. 192/4 A; 188/272; 188/294; 188/295
[58] Field of Search ............... 188/291, 293, 294, 295, 188/272; 192/4 A

[56] References Cited

U.S. PATENT DOCUMENTS

| | | | |
|---|---|---|---|
| 1,923,115 | 8/1933 | Rash et al. | 188/294 |
| 2,640,563 | 6/1953 | Sanders | 188/294 |
| 2,771,967 | 11/1956 | Larson | 188/291 |

FOREIGN PATENT DOCUMENTS

| | | | |
|---|---|---|---|
| 538514 | 1/1956 | Italy | 188/291 |
| 86/02608 | 5/1986 | PCT Int'l Appl. | |

*Primary Examiner*—Rodney H. Bonck
*Assistant Examiner*—David A. Testardi
*Attorney, Agent, or Firm*—Herbert Dubno

[57] ABSTRACT

A drive arrangement for a commercial motor vehicle has a variable-speed transmission in which a brake is provided. The brake is formed as a radial-piston pump in which the piston under the control of the control pressure can be selectively coupled with a lifting element driven by a small gear meshing with a large gear on a driven shaft of the transmission.

1 Claim, 1 Drawing Sheet

DRIVE ARRANGEMENT FOR COMMERCIAL MOTOR VEHICLES

CROSS REFERENCE TO RELATED APPLICATIONS

This application is a continuation-in-part of Ser. No. 06/887,171 filed June 23, 1986 as a United States National Phase application of PCT/EP85/00554 filed Oct. 21, 1985, published as WO86/02608 on May 9, 1986, now abandoned, and based, in turn, upon Luxembourg PCT application PCT/EP84/00326 filed Oct. 24, 1984 under the International Convention.

FIELD OF THE INVENTION

My present invention relates to a drive arrangement for commercial motor vehicles having a variable speed transmission and a continuous-duty brake driven via a step-up gear and mounted on a shaft which is parallel to the driven shaft of the variable-speed transmission and offset with respect thereto.

BACKGROUND OF THE INVENTION

A drive arrangement of the aforedescribed type is known from German published application No. 23 60 804. In that arrangement, an auxiliary drive, which is provided for other purposes, is also involved in the actuation of the continuous-duty brake. As a result, rotational speed is imparted to the continuous-duty brake which is always higher than the rotational speed of the primary shaft of the variable-speed transmission. This system has the disadvantage that large additional masses must be driven and have to be synchronized at each shifting of speeds. When the driving motor is out of service, for example, or during towing, the continuous-duty braking device is ineffective.

OBJECTS OF THE INVENTION

It is the object of this invention to provide an improved drive arrangement for commercial motor vehicles in which a continuous-duty brake is associated with a transmission, so that the continuous-duty brake can be operated without being affected by a need for synchronization and without traction-force interruption.

Another object of this invention is to provide a drive system of the type described utilizing a continuous-duty brake with improved means for decoupling the braking effect or drag from the transmission.

Another object of the invention is to provide an improved drive arrangement which extends the principles originally enunciated in my copending application Ser. No. 06/887,171.

SUMMARY OF THE INVENTION

These objects and others which will become apparent hereinafter are attained, in accordance with the present invention in a drive arrangement for a commercial motor vehicle which comprises a variable-speed transmission having a driven output shaft, a brake shaft offset from but parallel to the driven output shaft, step-up gearing including a large drive gear on said driven output shaft and a small driven gear on the brake shaft meshing with the drive gear and a continuously effective or continous-duty brake connectable to the brake shaft.

According to the invention, the continuous-duty brake includes a radial-piston machine having a radial piston and a lifting element driven by the brake shaft, the radial piston being engageable with and disengageable from the lifting element. The lifting element may be a crank or crankshaft.

Means is provided for selectively applying a control pressure to the piston for maintaining the piston in engagement with the lifting element for displacement of the piston to brake the brake shaft and for selectively leaving the control pressure for disengaging the piston from the lifting element to decouple the brake from the brake shaft.

The continuous-duty brake is thus directly driven from the driven shaft of the variable transmission. As a result, no traction force interruptions or variations in torque occur during shifting of the variable transmission. The free length of any universal joint shaft mounted between the transmission and the driven axle of the vehicle is not shortened because of the presence of the brake arrangement.

The means for decoupling the piston from the brake shaft allows the brake to be taken out of operation during normal traffic. As a result, it is possible to reduce drive losses of the type which occur when an emptied hydraulic retarder or hydrodynamic brake is used as a continuous-duty brake.

The arrangement of the brake device directly at a driven shaft of the variable-speed transmission and thus close to the point at which the driven shaft exits from the variable-speed transmission does not require additional space, especially when the brake is provided in place of a tachometer drive. The tachometer can then be driven in a simple manner by an electronic transmitter. The radial piston pump used as a brake, in accordance with the invention, offers the possibility of braking the vehicle until it is completely arrested. Since the plungers are lifted from the lifting device, idling drag can be considerably reduced and it is superfluous to provide a separate clutch.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
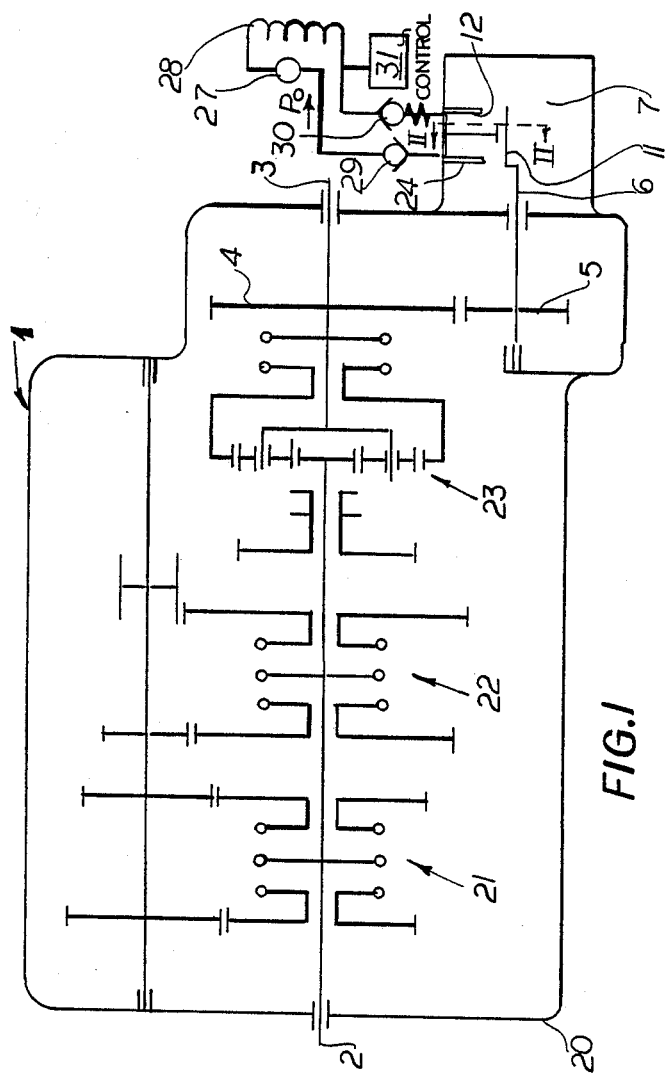
FIG. 1 is a diagrammatic section through a drive arrangement according to the invention.

The drive arrangement shown in FIG. 1 is intended for a commercial vehicle and comprises a variable-speed transmission but which can be either an automatic transmission or a manual transmission.

The variable-speed transmission 1 has an input shaft or drive shaft 2 connected to an engine and rotatable in the transmission housing 20. The driven shaft is shown at 3 and can be connected via a universal joint shaft to the driven axle of the vehicle. Within the transmission sets of gears 21, 22 and 23 can be provided and for manual or automatic shifting to select the various speed ratios and the last-mentioned set of gears 23 forms a planetary gearing.

Close to the point at which the driven shaft 3 extends from the housing 20, a large gear wheel 4 is mounted on this driven shaft. The large gear wheel 4 meshes with a small gear wheel 5 which is carried by a brake shaft 6 journaled in the housing.

The brake shaft 6 is parallel to the driven shaft 3 and offset with respect to the driven shaft and is connected to a continuous-duty brake device 7.

In FIG. 1, the continuous-duty brake device is formed as a radial-piston machine and has a lifting element 11 which is an eccentric or cam plate, shown basically as a crank in the drawing. The plungers represented by the radial piston 12 are moved in the radial direction within cylinders 24, only one of which has been shown.

The system of FIG. 1 is provided with means for lifting the plungers from their lifting elements and constructed in such a way that the plungers can be lifted from the lifting element during normal traffic by control pressure. When the brake is in operation, these plungers are kept on the lifting element by spring force. It is also possible however to subject the plungers to control pressure by an external actuation of the brake and to keep them in this manner on the lifting element.

Figure 2:
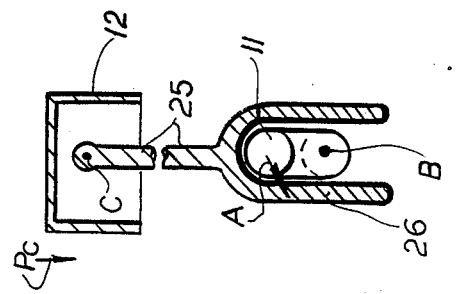
FIG. 2 is a section taken along the line II—II of FIG. 1 omitting the cylinder for the radial piston.

When the control pressure is absent, the plungers are lifted by the lifting element and stop in their end position. This operation can best be understood by first turning to FIG. 2 which shows a piston 12 connected by the piston rod 25 to the eccentric shaft 11 forming a lifting element. The rod 25 can be provided with a fork 26 which straddles the eccentric shaft 11.

When a control pressure is applied to the piston 12 in the direction of the arrow $P_c$, the piston follows the movement of the eccentric shaft 11 as the eccentric shaft rotates in the direction of the arrow A about the axis B, the piston being guided vertically as the rod 25 swings about the pivot axis C on the piston. During the upward stroke, liquid is displaced with a pressure $P_o$ representing the output pressure of the radial piston pump. The pressure $P_o$, of course, exceeds the pressure $P_c$. The liquid is displaced, e.g. through a throttle 27 in a closed loop 28 to return to the cylinder.

A check valve 29 permits the outflow of the fluid while a spring-loaded check valve 30 (FIG. 1) permits return of the fluid to the piston. The control pressure $P_c$ is supplied by a control pressure source represented at 31. For normal vehicle operation, when retardation by the brake is not desired, no control pressure is applied. In that case, once each piston 12 has reached the limit of its upward travel, there is no tendency for the piston to follow further the downward movement of the eccentric shaft or lifting element 11, since no downward pressure is applied and the piston is not entrained in the downward direction. The piston then remains in its upper position until the control pressure is again supplied.

I claim:

1. A drive arrangement for a commercial motor vehicle, comprising:
    a variable-speed transmission having a driven output shaft;
    a brake shaft offset from but parallel to said driven output shaft;
    step-up gearing including a large drive gear on said driven output shaft and a small driven gear on said brake shaft;
    a continuous duty brake connectable to said brake shaft and including a radial-piston machine having a radial piston and a lifting element driven by said brake shaft, said radial piston being engageable with and disengageable from said lifting element, said radial piston being reciprocatable in a cylinder between a radially inner position and a radially outer position to vary a volume of a chamber of said cylinder; and
    means including a check valve permitting flow from said chamber and a spring check valve permitting flow to said chamber for selectively applying a control pressure to said piston for maintaining said piston in engagement with said lifting element for displacement of said piston to brake said brake shaft exclusively upon the application of said control pressure, and for selectively relieving said control pressure for disengaging said piston from said lifting element exclusively upon the elimination of said control pressure to decouple said brake from said brake shaft, said piston remaining in the radially outer position while said brake is decoupled from said brake shaft.

* * * * *